(12) United States Patent
Zhu et al.

(10) Patent No.: US 10,643,634 B2
(45) Date of Patent: May 5, 2020

(54) MULTICHANNEL ECHO CANCELLATION CIRCUIT AND METHOD AND SMART DEVICE

(71) Applicant: Goertek Inc., Weifang, Shandong Province (CN)

(72) Inventors: Jian Zhu, Weifang (CN); Xiangdong Zhang, Weifang (CN); Zhenyu Yu, Weifang (CN); Zhiping Luo, Weifang (CN); Dong Yan, Weifang (CN)

(73) Assignee: GOERTEK INC., Weifang, Shandong (CN)

( * ) Notice: Subject to any disclaimer, the term of this patent is extended or adjusted under 35 U.S.C. 154(b) by 9 days.

(21) Appl. No.: 15/780,156

(22) PCT Filed: Dec. 8, 2017

(86) PCT No.: PCT/CN2017/115229
§ 371 (c)(1),
(2) Date: May 30, 2018

(87) PCT Pub. No.: WO2018/227902
PCT Pub. Date: Dec. 20, 2018

(65) Prior Publication Data
US 2019/0362733 A1    Nov. 28, 2019

(30) Foreign Application Priority Data

Jun. 15, 2017  (CN) .......................... 2017 1 0452304

(51) Int. Cl.
*H04R 5/02*    (2006.01)
*G10L 21/0232*  (2013.01)
(Continued)

(52) U.S. Cl.
CPC ............ *G10L 21/0232* (2013.01); *H04R 5/02* (2013.01); *H04R 5/04* (2013.01); *H04S 3/008* (2013.01);
(Continued)

(58) Field of Classification Search
CPC ............ G10L 21/0202; G10L 21/0205; G10L 21/0208; G10L 21/0216; G10L 21/0232;
(Continued)

(56) References Cited

U.S. PATENT DOCUMENTS 3,060,265 A * 10/1962 Duncan ................... H04M 3/54
                                                    379/206.01
5,237,619 A *  8/1993 Frassinetti ............. H04R 60/04
                                                       381/100
(Continued)

FOREIGN PATENT DOCUMENTS

CN        101562669 A      10/2009
CN        103077726 A       5/2013
(Continued)

OTHER PUBLICATIONS

International Search Report issued in International Patent Application No. PCT/CN2017/115229 dated Mar. 20, 2018.
(Continued)

*Primary Examiner* — Leshui Zhang
(74) *Attorney, Agent, or Firm* — Arent Fox, LLP

(57) ABSTRACT

The application discloses a multichannel echo cancellation circuit and method and smart device. The multichannel echo cancellation circuit comprises signal extraction circuits, one ends of which are connected to the audio channels of the corresponding loudspeakers, to extract part of the audio signals from the audio channels of the corresponding loudspeakers as echo cancellation reference signals; the other ends of the signal extraction circuits are connected to the
(Continued)

isolating circuits; the isolating circuits are interconnected to form one noise channel by which the echo cancellation reference signals extracted by each of the signal extraction circuits are formed into one channel of noise signal and then outputted to the processor; and the processor subtracts the noise signal from the sound signal collected by the microphone according to the noise signal inputted and a sound signal collected by a microphone, to obtain a signal that has been denoised.

14 Claims, 2 Drawing Sheets

(51) Int. Cl.
*H04R 5/04* (2006.01)
*H04S 3/00* (2006.01)
*G10L 21/0208* (2013.01)

(52) U.S. Cl.
CPC . *G10L 2021/02082* (2013.01); *H04S 2400/01* (2013.01)

(58) Field of Classification Search
CPC ....... G10L 21/0224; G10L 2021/02082; G10L 2021/02161; G10L 2021/02163; G10L 2021/02166; G10L 2021/02165; G10L 19/012; G10L 19/00; G10L 15/20; G10L 21/02–0388; H04R 5/02; H04R 5/04; H04R 25/43; H04R 2420/01; H04R 3/02; H04R 3/002; H04R 3/005; H04R 2499/11; H04R 2499/13; H04R 2499/15; H04R 2430/03; H04R 1/1083; H04R 1/1091; H04R 1/406; H04R 27/00; H04R 2227/005; H04S 3/008; H04S 2400/00; H04B 1/00; H04B 3/23; H04B 3/20; H04B 3/234; H04B 3/235; H04M 9/082; H04M 9/08; H04M 3/002; H04M 3/568; H04M 1/72591; G10K 11/16; G10K 11/175; G10K 2210/505; G10K 2210/1081; G10K 11/002; G10K 11/346; G10K 11/178–17885; G10K 2210/30; G10K 2210/3012–30232; G10K 2210/3025; G10K 2210/3026; G10K 2210/3028; G10K 2210/30281; G10K 2210/3035; G10K 2210/30351; G10K 2210/506; H03G 3/20; H03G 5/165; H03G 9/025; H03F 2200/03
USPC ......... 381/17, 18, 19, 20, 21, 300, 301, 302, 381/303, 307, 119, 66, 27, 71.1–71.6, 381/71.9, 71.11, 71.12, 26, 318, 86, 92, 381/94.1, 93, 95, 96, 122, 123; 379/406.01–406.16; 455/569.1, 570; 704/E19.014, E21.002, E21.004, E21.007
See application file for complete search history.

(56) References Cited

U.S. PATENT DOCUMENTS

| | | | |
|---|---|---|---|
| 6,556,682 B1* | 4/2003 | Gilloire | H04M 9/082 |
| | | | 379/406.01 |
| 6,931,123 B1* | 8/2005 | Hughes | H04M 3/002 |
| | | | 379/406.01 |
| 9,659,555 B1* | 5/2017 | Hilmes | G10L 21/0272 |
| 2001/0028320 A1* | 10/2001 | Prendergast | H04B 3/23 |
| | | | 341/110 |
| 2002/0054685 A1* | 5/2002 | Avendano | H04M 9/082 |
| | | | 381/66 |
| 2010/0195841 A1* | 8/2010 | Pires | H04R 27/00 |
| | | | 381/61 |
| 2012/0170755 A1* | 7/2012 | Jonsson | H04M 9/082 |
| | | | 381/1 |
| 2012/0237047 A1* | 9/2012 | Neal | H04B 3/234 |
| | | | 381/66 |
| 2013/0177162 A1 | 7/2013 | Lim et al. | |
| 2014/0079232 A1* | 3/2014 | Houshuyama | H04R 3/02 |
| | | | 381/66 |
| 2015/0030172 A1* | 1/2015 | Gaensler | H04R 3/02 |
| | | | 381/71.2 |
| 2016/0173978 A1 | 6/2016 | Li et al. | |

FOREIGN PATENT DOCUMENTS

| | | |
|---|---|---|
| CN | 104464739 A | 3/2015 |
| CN | 107105366 A | 8/2017 |
| WO | WO 2015039439 A1 | 3/2015 |

OTHER PUBLICATIONS

International Written Opinion issued in International Patent Application No. PCT/CN2017/115229 dated Mar. 20, 2018.

\* cited by examiner

MULTICHANNEL ECHO CANCELLATION CIRCUIT AND METHOD AND SMART DEVICE

CROSS-REFERENCE TO RELATED APPLICATION

This application is a National Stage entry of International Application No. PCT/CN2017/115229, filed on Dec. 8, 2017, which claims priority to Chinese Patent Application No. 201710452304.5, filed on Jun. 15, 2017. The disclosure of the priority applications are hereby incorporated in their entirety by reference.

TECHNICAL FIELD

The application pertains to the technical field of audio signal processing, and particularly relates to a multichannel echo cancellation circuit and method and smart device.

BACKGROUND

With the progress of electronic information and acoustic technologies as well as the development of smart hardware products such as robots, man-machine interaction technique based on voice recognition is increasingly used in products such as mobile telephones, robots, smart sound equipments and smart television sets.

In practical applications, the first problem of the human machine interaction or human computer interaction based on voice recognition is the interference of external noise, particularly of the sound played by loudspeakers of the product itself. As both the loudspeakers and the microphone are attached to the product and very close to each other in the space, the audio played by the loudspeakers will be easily transmitted back to the system via the microphone. Therefore, the voice instruction of the user will be covered by the noise of loudspeakers and cannot be sent to the system, and the system cannot identify the voice instruction of the user. Such a phenomenon is called echo interference. Presently, echo interference has already become a problem to be solved first in the voice interaction design of smart hardware products.

The echo cancellation technology emerges accordingly. However, the current echo cancellation technology is generally for one loudspeaker only, in other words, it can cancel a single channel of noise. On the other hand, most products are designed to have two sound channels corresponding to two loudspeakers or even more sound channels. The single channel noise cancellation cannot satisfy the actual demand of products.

SUMMARY

The application provides a multichannel echo cancellation circuit and method and smart device for cancelling the echo of multichannel products to satisfy the actual demand.

According to an aspect of the application, there is provided a multichannel echo cancellation circuit comprising: a processor, signal extraction circuits and isolating circuits, wherein the numbers of the signal extraction circuits and the number of the isolating circuits correspond to the number of audio channels of loudspeakers;

one end of each of the signal extraction circuits is connected to the audio channel of the corresponding loudspeaker, and is for extracting part of audio signal from the audio channel of the corresponding loudspeaker as an echo cancellation reference signal;

the other end of each of the signal extraction circuits is connected to each of the isolating circuits, respectively;

the isolating circuits are interconnected to form one noise channel, and by the one noise channel the echo cancellation reference signals extracted by each of the signal extraction circuits are formed into one channel of noise signal and then outputted to the processor; and the processor, according to a noise signal inputted and a sound signal collected by the microphone, subtracts the noise signal from the sound signal that is collected by the microphone, to obtain a signal that has been denoised.

According to another aspect of the application, there is provided a multichannel echo cancellation method comprising the steps of:

extracting, by signal extraction circuits, part of audio signals from audio channels of each of corresponding loudspeakers as echo cancellation reference signals, wherein the number of the signal extraction circuits is the same as the number of the audio channels of the loudspeakers, one end of each of the signal extraction circuits is connected to the audio channel of the corresponding loudspeaker, and the other end of each of the signal extraction circuits is connected to each of the isolating circuits, respectively;

interconnecting the isolating circuits that connect to the other ends of the signal extraction circuits to form one noise channel, forming by the noise channel the echo cancellation reference signals into one channel of noise signal and outputting the one channel of noise signal to a processor; and acquiring by the processor a sound signal collected by a microphone, and according to the noise signal inputted and the sound signal that is collected by the microphone, subtracting the noise signal from the sound signal that is collected by the microphone, to obtain a signal that has been denoised.

According to yet another aspect of the application, there is provided a smart device comprising the multichannel echo cancellation circuit as stated in the above aspect.

The advantageous effects of the application are as follows. The multichannel echo cancellation circuit of the embodiments of the application can achieve the echo cancellation of multichannel multi-loudspeaker products. The audio signal of a plurality of sound channels is extracted respectively by using signal extraction circuits the number of which corresponds to the number of the audio channels of the loudspeakers, and is coupled into one channel of noise signal by one noise channel formed by interconnected isolating circuits, and then is transferred to the processor. Thereby, multichannel echo cancellation can be achieved, the echo cancellation performance of product can be improved, and the accuracy of man-machine interaction of product can be increased. In addition, because the isolating circuits are interconnected to form one noise channel, the echo cancellation reference signals that are extracted by each of the audio channels can be converged into one channel of noise signal and provided to the processor, so the processor needs only one audio interface to receive noise signals, thereby the requirement on the processor is reduced, and the cost is saved. Moreover, the design of the isolating circuits prevents the crosstalk between multiple loudspeakers, and improves the quality of sound outputted by the multiple loudspeakers, and the market competitiveness of the product is improved.

DETAILED DESCRIPTION

In echo cancellation, an audio signal is first collected from an audio channel of a loudspeaker and digital processed to obtain a noise sample, then a voice signal and a noise are collected from a microphone and audio processed by a DSP (Digital Signal Processing) processor to remove the noise in the audio signal collected by the microphone, thereby a clean user voice signal is obtained and then transferred to a related late-stage system to conduct voice recognition and so on. So echo cancellation is crucially important for the voice recognition and voice interaction of product. The echo cancellation technique of the prior art is generally used to single sound channel only.

There is an echo cancellation solution that can be applied to multiple sound channels, in which the multiple sound channels are directly connected by signal wires without sufficient separation therebetween, and crosstalk will occur between the loudspeakers.

For example, when the left sound channel is playing at full volume and the right sound channel is silent, the music played by the left sound channel can be heard from the loudspeaker of the right sound channel because of the crosstalk. Additionally, the direct connection of the multiple sound channels means that the ground wires of a plurality of audios are connected together, which will generate extra common ground noises (the noises on the ground between different grounding points). When these common grounding noises are transferred to the DSP, the denoising performance of echo cancellation will apparently become worse, and unwanted noises will appear, and the tone quality of the loudspeakers is affected adversely.

There is another echo cancellation solution, in which the noise signals are extracted respectively for the audio channels of each of the loudspeakers and then sent to the DSP to conduct echo cancellation. However, in such a solution the DSP must have a plurality of corresponding audio interfaces, and the echo cancellation by the DSP needs multiple denoising processing, and the cost is high.

Thus, the application provides a multichannel echo cancellation circuit which requires only one noise audio channel and thus the cost is low, and various unwanted audio noise interferences can be removed. The technical proposal of the application is to provide isolating circuits, for example to use transformers in the isolating circuits. The transformers are inductive coupled and commonly used to transform voltage or impedance of a load. By setting the working frequency range of the transformer to 10-20000 Hz, which overlaps with the frequency ranges of the audio signals of the loudspeakers, the conversion and reverse isolation of the audio signals can be realized, and the denoising effect is improved.

Figure 1:
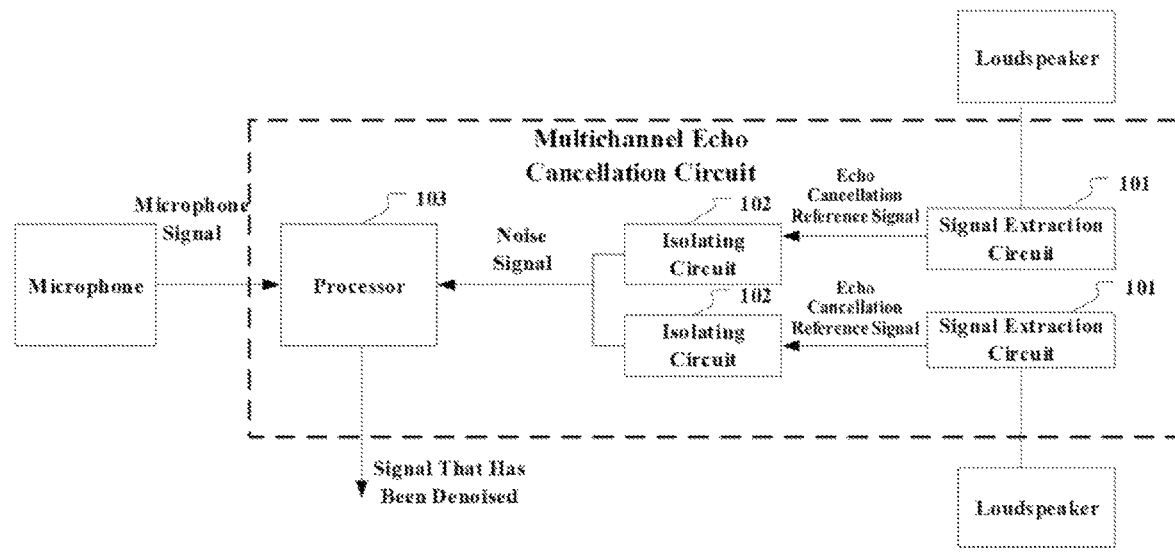
FIG. 1 is a block diagram of a multichannel echo cancellation circuit in accordance with some embodiments of the application.

FIG. 1 is a block diagram of a multichannel echo cancellation circuit in accordance with some embodiments of the application. Referring to FIG. 1, the multichannel echo cancellation circuit of the present embodiment comprises: a processor 103, and signal extraction circuits 101 and isolating circuits 102, wherein the numbers of the signal extraction circuits and the number of the isolating circuits correspond to the number of audio channels of loudspeakers;

one end of each of the signal extraction circuits 101 is connected to the audio channel of the corresponding loudspeaker, and is for extracting part of audio signal from the audio channel of the corresponding loudspeaker as an echo cancellation reference signal;

the other end of each of the signal extraction circuits 101 is connected to each of the isolating circuits 102, respectively;

the isolating circuits 102 are interconnected to form one noise channel, and the echo cancellation reference signals that are extracted by each of the signal extraction circuits 101 are combined into one noise signal at the one noise channel, and the one noise signal at the one noise channel is further outputted to the processor 103; and the processor 103, according to a noise signal inputted and a sound signal collected by the microphone, subtracts the noise signal from the sound signal that is collected by the microphone, to obtain a signal that has been denoised.

As can be seen from FIG. 1 that, the echo cancellation circuit of the embodiments of the application, by using the signal extraction circuits that are connected to the audio channels of each of the loudspeakers, extracts part of the signals from the audio channels of the loudspeakers as echo cancellation reference signals, and then outputs them to the processor through the isolating circuits that are connected to the signal extraction circuits. Because the isolating circuits are interconnected, the echo cancellation reference signals can be formed into one channel of noise signal and sent to the processor via one noise channel to be denoised by the processor. In this way, the processor needs only one audio interface to receive the one channel of noise signal outputted by the isolating circuits, and does not need a plurality of audio interfaces, which reduces the requirement on the processor, and saves the cost. In addition, in the present embodiment, the signal extraction circuits of each of the audio channels are separated, and the extraction of signals does not influence each other. After the echo cancellation reference signals are extracted, one noise channel is formed by the isolating circuits interconnected, and the one channel of noise signal formed is outputted to the processor via the one noise channel, which prevents the influence of crosstalk during the process of the multiple sound channels are directly connected to conduct signal extraction, and also prevents the generation of extra common grounding noises, thereby improving the denoising performance of echo cancellation, and ensuring the tone quality of the loudspeakers.

It should be noted that, FIG. 1 describes the example of two sound channels, and two signal extraction circuits and two isolating circuits corresponding to the two sound channels, but the embodiments of the application are not limited thereto.

Figure 2:
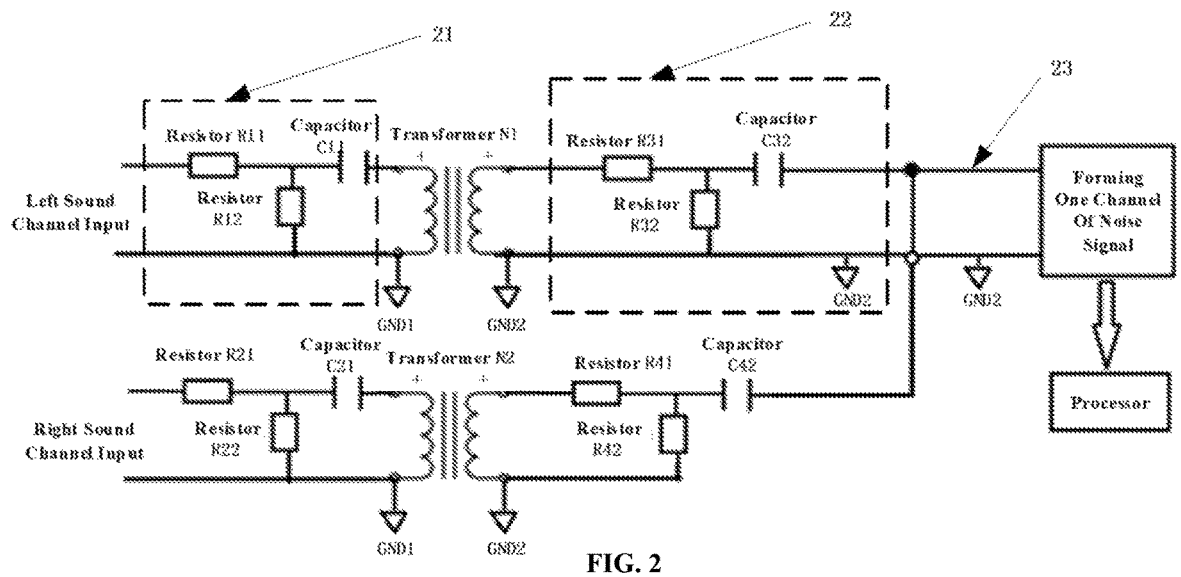
FIG. 2 is a circuit diagram of a multichannel echo cancellation circuit in accordance with some embodiments of the application.

As shown in FIG. 2, in the present embodiment, the isolating circuit comprises: a first stage transformer (such as the transformer N1 illustrated in FIG. 2) and an output matching network 22 connected to an output end of the first stage transformer, the signal extraction circuit is an input matching network 21, the input matching network 21 obtains an echo cancellation reference signal after an audio signal of the corresponding loudspeaker (for example, a left loudspeaker) passes through, the echo cancellation reference signal is inputted to the corresponding first stage transformer, and a plurality of the output matching networks 22 are interconnected to form one noise channel 23 by which the echo cancellation reference signals are formed into one channel of noise signal and then outputted to the processor.

It should be emphasized that, in the present embodiment, the first stage transformer is selected to be a low-frequency transformer, and a working frequency range of the transformer is the same as a frequency range of the audio signal outputted to the loudspeaker. For example, the working frequency range of the transformer is set within the range of 10-20000 Hz, which is the same as the frequency range of the audio signal of the loudspeaker, to realize the conversion and reverse isolation of the audio signals.

The input matching network and the output matching network are formed by passive elements comprising resistors and capacitors. Referring to FIG. 2, in the present embodiment, the input matching network 21 comprises: a first input resistor (the resistor R11 illustrated in FIG. 2), a first input capacitor (the capacitor C11 illustrated in FIG. 2) and a second input resistor (the resistor R12 illustrated in FIG. 2).

An input end of the first stage transformer (such as the transformer N1 illustrated in FIG. 2) is connected in series to the first input capacitor C11, and then is connected to one end of the second input resistor R12 and one end of the first input resistor R11, the other end of the second input resistor R12 is connected to a first grounding end of the first stage transformer N1, the first grounding end is connected to the ground wire (namely, the GND3 illustrated in FIG. 2) of the loudspeaker (such as the left loudspeaker), and the other end of the first input resistor R11 is connected to an audio signal wire of the loudspeaker. Namely, the input end of the first stage transformer N1 is connected in series to the first input capacitor C11, then is connected in parallel to the second input resistor R12, and finally is connected in series to the first input resistor R11.

The output matching network 22 comprises: a first output resistor (the resistor R31 illustrated in FIG. 2), a first output capacitor (the capacitor C32 illustrated in FIG. 2) and a second output resistor (the resistor R32 illustrated in FIG. 2).

An output end of the first stage transformer (such as the transformer N1 illustrated in FIG. 2) is connected in series to the first output resistor R31, and then is connected to one end of the first output capacitor C32 and one end of the second output resistor R32, the other end of the second output resistor R32 is connected to a second grounding end of the first stage transformer N1, and the second grounding end is connected to a ground wire (namely, the GND2 illustrated in FIG. 2) of the processor. The GND2s illustrated in FIG. 2 are the common ground of the echo cancellation circuit of the present embodiment. Namely, the output end of the first stage transformer N1 is connected in series to the first output resistor R31, then is connected in parallel to the second output resistor R32, and finally is connected in series to the first output capacitor C32. As can be seen from FIG. 2, in the present embodiment, the ground wire of the audio signal wire and the ground wire of the processor are completely isolated, which prevents the hum interference caused by the sharing of one ground by the ground wire of the loudspeaker and the ground wire of the processor.

The other end of the first output capacitor C32 is connected to the noise channel 23, and the noise channel 23 is connected to the audio input end (the audio input end is the audio interface) of the processor. Here, the first input capacitor C11 and the first output capacitor C32 are bridging capacitors, and typically, may be bridging capacitors with a capacitance value of 4.7 μF. A bridging capacitor refers to a capacitor that blocks the direct-current component in a signal and allows the alternating-current component to be smoothly transferred to the next stage circuit.

The above describes the circuit structure by taking the example of the left sound channel. As the circuit structure of the right sound channel is the same as that of the left sound channel in FIG. 2, the circuit structure of the right sound channel is not described repeatedly.

As can be seen from FIG. 2, in the present embodiment, by forming the input matching network using the first input resistor, the first input capacitor and the second input resistor, the object of extracting part of the signal from the sound channel of the corresponding loudspeaker as the echo cancellation reference signal is achieved. In the present embodiment, the function of the input matching network is to realize the matching between the output impedance of the loudspeaker and the input impedance of the transformer, namely, to ensure extracting the low-power signal with the working frequency of the transformer from the high-power signal of loudspeakers, to suppress harmonic component and interference with a frequency different from the working frequency to a certain extent. The function of the output matching network is to ensure the matching between the output impedance of the transformer and the input impedance of the processor, to reduce reflection of audio signals on the lines and noise interference.

It should be noted that, as the power of the signal of the loudspeaker is generally high, when part of the signal is extracted from the audio signal of the audio channel of the loudspeaker, it is required to select an appropriate transformer ratio to determine the power of the extracted signal. In the present embodiment, the device lectotype of the input matching network is determined by the following formula:

$$\frac{\frac{R_{12} \times Z_1}{R_{12} + Z_1}}{\left(\frac{R_{12} \times Z_1}{R_{12} + Z_1}\right) + R_{11}} = A_1$$

where $R_{12}$ is a resistance value of the second input resistor, $Z_1$ is an input impedance of the first stage transformer, $R_{11}$ is a resistance value of the first input resistor, and $A_1$ is a preset transformer ratio value of the first stage transformer (such as the transformer N1 in FIG. 2). The transformer ratio value of a transformer refers to the ratio of the input voltage to the output voltage of the transformer.

In practical applications, the extracting of audio signals is realized by selecting the appropriate ratio of the input voltage to the output voltage of a transformer, namely, to extract a low-power signal from the audio channel of a high-power signal of loudspeaker to be used in echo cancellation. Because the reverse attenuation of the transformer is as high as 20 dB, which means that only 1/100 of the signal can be reversely transmitted, the crosstalk between the left and the right sound channels can be prevented, and the performance of the echo cancellation is improved.

The device lectotype of the input matching network connected to the right sound channel can use the above formula and is not repeated here.

After low-power echo cancellation reference signals are extracted by using the input matching networks that are connected to the sound channels of each of the loudspeakers, the echo cancellation circuit of the present embodiment, by using the transformer and the output matching network connected to the transformer, achieves the object of matching the impedance of the transformer with the impedance of the processor, thereby preventing the problem that the impedance of the transformer and the processor do not match, which results in the reverse transmitting of the signals and reduces the echo cancellation performance.

In order to reach impedance matching, in the present embodiment, the device lectotype of the output matching network is determined by the following condition:

$$\frac{(K_1 + R_{31}) \times R_{32}}{K_1 + R_{31} + R_{32}} = G$$

where $R_{31}$ is a resistance value of the first output resistor, $K_1$ is an output impedance of the first stage transformer, $R_{32}$ is a resistance value of the second output resistor, and G is an input impedance of an audio interface of the processor.

The signal processing of the echo cancellation circuit as shown in FIG. 2 is as follows. The input matching network connects the left and the right sound channels, acquires the sound signals of the left and the right sound channels, and inputs them to the transformers N1 and N2 respectively to conduct inductive coupling and power conversion. The audio output signals of the transformers N1 and N2 pass through the two output matching networks respectively, and form one channel of noise signal which is then inputted to an echo cancellation device such as DSP to be processed, to obtain a signal output that has been denoised.

Thus, by the circuit design that comprises the matching networks and the transformers, it can be ensured that the signal inputted into the DSP contains left and right audio signal with the same power, and echo cancellation can be better achieved.

The above embodiment describes the example that the isolating circuit comprises the first stage transformer. In other embodiments of the application, the isolating circuit may also comprise a second stage transformer. Particularly, output ends of each of the output matching networks are connected to input ends of the second stage transformer, and are formed into one noise channel by the second stage transformer, the echo cancellation reference signals are formed into one channel of noise signal by the one noise channel and then outputted to the processor.

Referring to FIG. 2, the solid black dot corresponding to the connection of the output matching networks of the left and the right sound channels may be replaced by a transformer, namely, a second stage transformer is provided. Thus, by providing the second stage transformer, the multiple channels of echo cancellation reference signals are combined into one channel of noise signal, and by means of the isolating characteristic of the transformer, the isolation between the sound channels is achieved, to ensure that only the audio signals pass and the signals other than the audio signals are filtered out, to reduce the noise interference and improve the echo cancellation performance.

Figure 3:
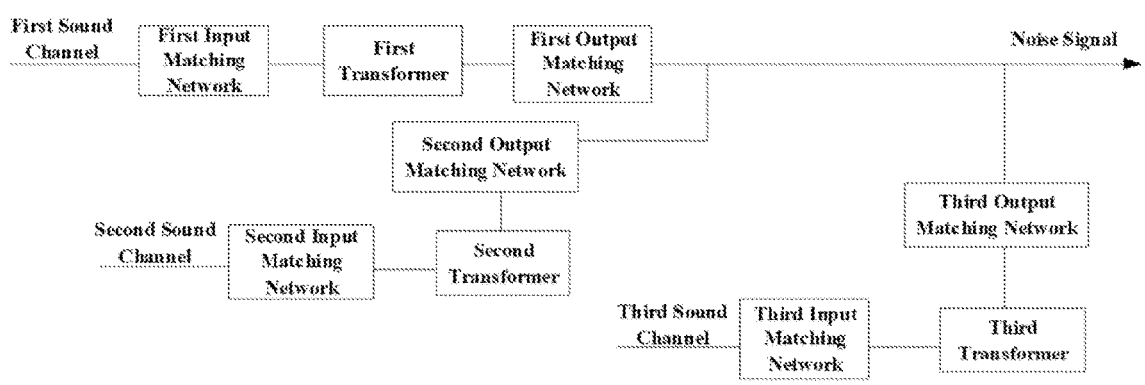
FIG. 3 is a block diagram of a multichannel echo cancellation circuit in accordance with other embodiments of the application.

The above described the structure of the echo cancellation circuit when the product is provided with two sound channels. The structure of the echo cancellation circuit is similar when the product comprises more than two sound channels. When echo cancellation is required for more sound channels, the only thing needed is to connect the corresponding number of the input matching networks, the output matching networks and the transformers. As shown in FIG. 3, when the product has three sound channels, namely, a first sound channel, a second sound channel and a third sound channel, the first sound channel is connected to a first input matching network, the first input matching network is connected to a first transformer, and the first transformer is connected to a first output matching network. The second sound channel is connected to a second input matching network, the second input matching network is connected to a second transformer, and the second transformer is connected to a second output matching network. The third sound channel is connected to a third input matching network, the third input matching network is connected to a third transformer, and the third transformer is connected to a third output matching network. The first output matching network, the second output matching network and the third output matching network are connected to construct one noise channel, to output the one channel of noise signal formed.

Likewise, in other embodiments, more audio channels may be connected to transformers via input matching networks, and then the outputs of the transformers are connected to one noise channel via output matching networks, thereby the one channel of noise signal is sent to the processor via one noise channel to be processed by it.

As the working process of the echo cancellation circuit with a plurality of sound channels is the same as the working process of the above circuit shown in FIG. 2, it is not described repeatedly here.

Figure 4:
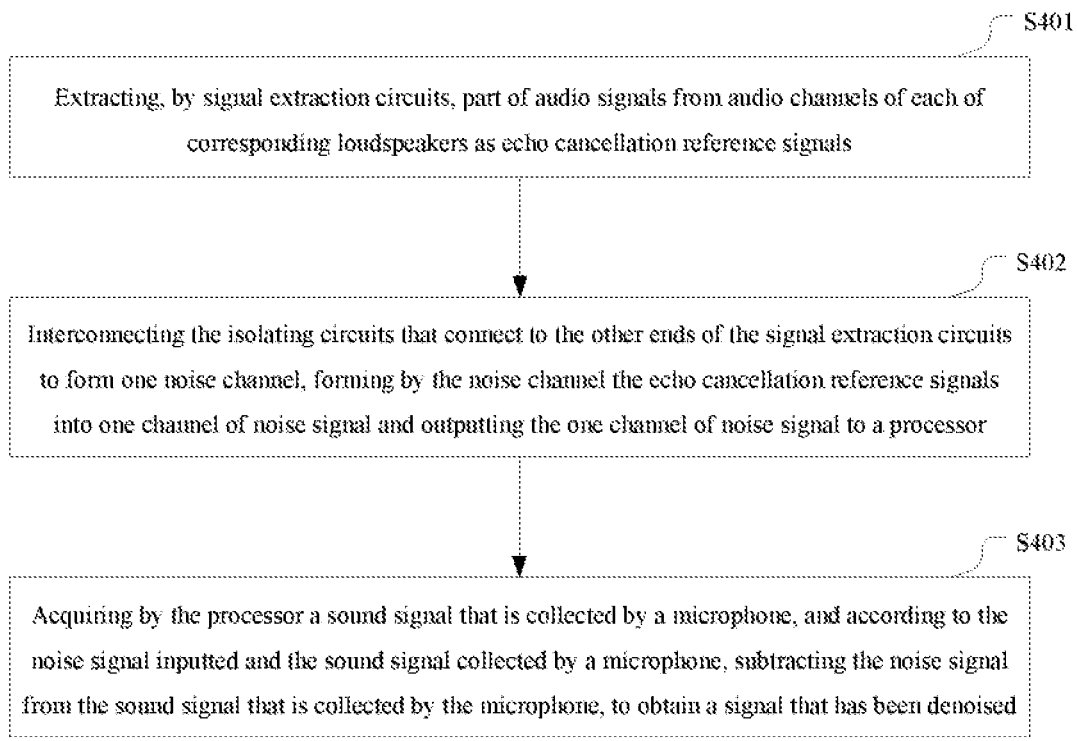
FIG. 4 is a schematic diagram of a flow of the multichannel echo cancellation method in accordance with some embodiments of the application.
Figure 5:
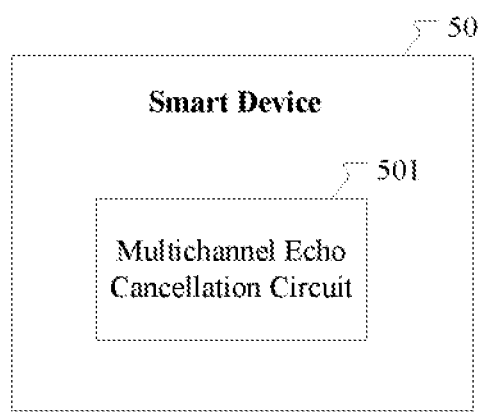
FIG. 5 is a structural block diagram of a smart device in accordance with some embodiments of the application.

Corresponding to the above multichannel echo cancellation circuit, the application further provide a multichannel echo cancellation method. FIG. 4 is a schematic flow diagram of a multichannel echo cancellation method in accordance with other embodiments of the application. As shown in FIG. 4, the multichannel echo cancellation method comprises the following steps:

Step S401, extracting, by signal extraction circuits, part of audio signals from audio channels of each of corresponding loudspeakers as echo cancellation reference signals, wherein the number of the signal extraction circuits is the same as the number of the audio channels of the loudspeakers, one end of each of the signal extraction circuits is connected to the audio channel of the corresponding loudspeaker, and the other end of each of the signal extraction circuits is connected to each of the isolating circuits, respectively;

Step S402, interconnecting the isolating circuits that connect to the other ends of the signal extraction circuits to form one noise channel, forming by the noise channel the echo cancellation reference signals into one channel of noise signal and outputting the one channel of noise signal to a processor; and Step S403, acquiring by the processor a sound signal that is collected by a microphone, and according to the noise signal inputted and the sound signal collected by a microphone, subtracting the noise signal from the sound signal that is collected by the microphone, to obtain a signal that has been denoised.

In some embodiments of the application, the step of interconnecting the isolating circuits connected to the other ends of the signal extraction circuits to form one noise channel comprises the step of: selecting a first stage transformer, connecting an output matching network to an output end of the first stage transformer, to construct the isolating circuit; and interconnecting a plurality of the output matching networks to form one noise channel.

In some embodiments of the application, the method further comprises the step of: constructing an input matching network by using passive elements, and using the input matching network as the signal extraction circuit, wherein the passive elements comprise resistors and capacitors; and the step of constructing an input matching network by using passive elements comprises the steps of: selecting a first input resistor, a first input capacitor and a second input resistor, connecting in series an input end of the first stage transformer to the first input capacitor, then connecting in parallel to the second input resistor, and finally connecting in series to the first input resistor, to construct the input matching network. Particularly, an input end of the first stage transformer is connected in series to the first input capacitor, and then is connected to one end of the second input resistor and one end of the first input resistor, the other end of the second input resistor is connected to a first grounding end of the first stage transformer, the first grounding end is connected to a ground wire of the corresponding loudspeaker, and the other end of the first input resistor is connected to an audio signal wire of the corresponding loudspeaker.

In some embodiments of the application, the method further comprises the step of: constructing an output matching network by using passive elements, wherein the passive elements comprise resistors and capacitors; and the step of constructing an output matching network by using passive elements comprises the steps of: selecting a first output resistor, a first output capacitor and a second output resistor, connecting in series an output end of the first stage transformer to the first output resistor, then connecting in parallel to the second output resistor, and finally connecting in series to the first output capacitor, to construct the output matching network. Particularly, an output end of the first stage transformer is connected in series to the first output resistor, and then is connected to one end of the first output capacitor and one end of the second output resistor, the other end of the second output resistor is connected to a second grounding end of the first stage transformer, and the second grounding end is connected to a ground wire of the processor.

In some embodiments of the application, the other end of the first output capacitor is connected to the noise channel, and the noise channel is connected to an audio input end of the processor; the first input capacitor and the first output capacitor are bridging capacitors, and the working frequency range of the first stage transformer is the same as the frequency range of the audio signal outputted to the loudspeaker.

In some embodiments of the application, the first stage transformer is selected as a low-frequency transformer, and the working frequency range of the first stage transformer is 10-20000 Hz, and capacitance values of the first input capacitor and the first output capacitor are selected to be 4.7 µF.

In some embodiments of the application, the step of interconnecting the isolating circuits connected to the other ends of the signal extraction circuits to form one noise channel comprises the steps of: selecting a first stage transformer, connecting an output matching network to an output end of the first stage transformer, connecting the output matching network to an input end of a second stage transformer, and connecting the output ends of each of the second stage transformer to form one noise channel.

In some embodiments of the application, the step of interconnecting the isolating circuits connected to the other ends of the signal extraction circuits to form one noise channel further comprises the steps of: selecting a second stage transformer, connecting output ends of each of the output matching networks to input ends of the second stage transformer to construct the isolating circuit, and forming one noise channel by the second stage transformer.

In some embodiments of the application, the device lectotype of the input matching network satisfies the following condition:

$$\frac{\frac{R_{12} \times Z_1}{R_{12} + Z_1}}{\left(\frac{R_{12} \times Z_1}{R_{12} + Z_1}\right) + R_{11}} = A_1$$

where $R_{12}$ is a resistance value of the second input resistor, $Z_1$ is an input impedance of the first stage transformer, $R_{11}$ is a resistance value of the first input resistor, and $A_1$ is a preset transformer ratio value of the first stage transformer.

In some embodiments of the application, the device lectotype of the output matching network satisfies the following condition:

$$\frac{(K_1 + R_{31}) \times R_{32}}{K_1 + R_{31} + R_{32}} = G$$

where $R_{31}$ is a resistance value of the first output resistor, $K_1$ is an output impedance of the first stage transformer, $R_{32}$ is a resistance value of the second output resistor, and G is an input impedance of an audio interface of the processor.

In addition, the application provides a smart device 50 comprising a multichannel echo cancellation circuit 501, which is the multichannel echo cancellation circuit described in the above embodiments. By using the multichannel echo cancellation circuit of the application, the smart device of the application improves the echo cancellation performance, and thus improves the voice interaction experience of the user, and further increases the market competitiveness of the smart device.

In conclusion, according to the echo cancellation circuit and method of the application, the echo cancellation reference signals are extracted respectively from the sound channels of each of the loudspeakers, then are formed into one noise signal and outputted to the processor via one noise sound channel. Thereby, multichannel echo cancellation can be achieved. The processor needs only one audio interface to receive noise, thereby the requirement on the processor is reduced, and the cost is saved. In addition, the sound channels of each of the loudspeakers maintain sufficient isolations therebetween, which prevents crosstalk. Furthermore, the loudspeakers maintain sufficient isolations from the GND ground network of the processor, which prevents the generation of common grounding noise and improves the echo cancellation performance.

The above merely describes specific embodiments of the application. By the teaching of the application, a person skilled in the art can make other modifications or variations on the basis of the above embodiments. A person skilled in the art should appreciate that, the detailed description above is only for the purpose of better explaining the application, and the protection scope of the application should be subject to the protection scope of the claims.

What is claimed is:

1. A multichannel echo cancellation circuit, comprising:
a processor;
a number of signal extraction circuits, and one end of each of the signal extraction circuits is connected to one of a number of audio channels corresponding to a number of loudspeakers, and wherein the number of the signal extraction circuits corresponds to the number of the audio channels of the loudspeakers, and each of the signal extraction circuits extracts part of each of audio signals as each of echo cancellation reference signals, from each of the audio channels corresponding to the number of the loudspeakers; and a number of isolating circuits, and one end of each of the isolating circuits is connected to other end of each of the signal extraction circuits, and wherein the number of the isolating circuits corresponds to the number of audio channels of the loudspeakers, and the isolating circuits are interconnected to combine the echo cancellation reference signals that are extracted by each of the signal extraction circuits into one noise signal at one noise channel, and the one noise signal at the one noise channel is further outputted to the processor, and wherein the processor, according to the one noise signal inputted and a sound signal collected by a microphone, subtracts the one noise signal from the sound signal that is collected by the microphone, to obtain a signal that has been denoised;

wherein each of the isolating circuits comprises a first stage transformer and an output matching network connected to an output end of the first stage transformer, and each of the signal extraction circuits is an input matching network, each of the audio signals of the loudspeakers passes through the input matching network to obtain each of the echo cancellation reference signals, each of the echo cancellation reference signals is inputted to the corresponding first stage transformer and then inputted to the corresponding output matching networks, and a plurality of the output matching networks are interconnected to form the one noise channel, the echo cancellation reference signals are combined into the one noise signal at the one noise channel; and wherein the function of the input matching network is to realize the matching between an output impedance of the loudspeakers and an input impedance of the first stage transformer, the function of the output matching network is to ensure the matching between an output impedance of the first stage transformer and an input impedance of the processor.

2. The multichannel echo cancellation circuit according to claim 1, wherein the input matching network comprises: a first input resistor, a first input capacitor and a second input resistor, and an input end of the first stage transformer is connected in series to the first input capacitor, and then the first input capacitor is connected to one end of the second input resistor and one end of the first input resistor, the other end of the second input resistor is connected to a first grounding end of the first stage transformer, the first grounding end is connected to a ground wire of the corresponding loudspeaker, and the other end of the first input resistor is connected to an audio signal wire of the corresponding loudspeaker; and the output matching network comprises: a first output resistor, a first output capacitor and a second output resistor, and an output end of the first stage transformer is connected in series to the first output resistor, and then the first output resistor is connected to one end of the first output capacitor and one end of the second output resistor, the other end of the second output resistor is connected to a second grounding end of the first stage transformer, the second grounding end is connected to a ground wire of the processor, the other end of the first output capacitor is connected to the noise channel, and the noise channel is connected to an audio input end of the processor.

3. The multichannel echo cancellation circuit according to claim 2, wherein a device lectotype of the input matching network satisfies the following condition:

$$\frac{\frac{R_{12} \times Z_1}{R_{12} + Z_1}}{\left(\frac{R_{12} \times Z_1}{R_{12} + Z_1}\right) + R_{11}} = A_1$$

where $R_{12}$ is a resistance value of the second input resistor, $Z_1$ is an input impedance of the first stage transformer, $R_{11}$ is a resistance value of the first input resistor, and $A_1$ is a preset transformer ratio value of the first stage transformer; and a device lectotype of the output matching network satisfies the following condition:

$$\frac{(K_1 + R_{31}) \times R_{32}}{K_1 + R_{31} + R_{32}} = G$$

where $R_{31}$ is a resistance value of the first output resistor, $K_1$ is an output impedance of the first stage transformer, $R_{32}$ is a resistance value of the second output resistor, and G is an input impedance of an audio interface of the processor.

4. The multichannel echo cancellation circuit according to claim 2, wherein the first input capacitor and the first output capacitor are bridging capacitors; and the working frequency range of the first stage transformer is the same as the frequency range of the audio signal outputted to the loudspeaker.

5. The multichannel echo cancellation circuit according to claim 4, wherein the first stage transformer is a low-frequency transformer, and the working frequency range of the first stage transformer is 10-20000 Hz; and capacitance values of the first input capacitor and the first output capacitor are 4.7 µF.

6. A multichannel echo cancellation method, comprising:

extracting part of each of audio signals, by each of a number of signal extraction circuits, as each of echo cancellation reference signals, from each of a number of audio channels corresponding to a number of loudspeakers, wherein the number of the signal extraction circuits corresponds to the number of audio channels of the loudspeakers, and one end of each of the signal extraction circuits is connected to one of the audio channels corresponding to the number of the loudspeakers;

interconnecting a number of isolating circuits to combine the echo cancellation reference signals that are extracted by each of the signal extraction circuits into one noise signal at one noise channel, wherein one end of each of the isolating circuits is connected to other end of each of the signal extraction circuits and the number of the isolating circuits corresponds to the number of audio channels of the loudspeakers;

outputting the one noise signal at the one noise channel to a processor;

subtracting, by the processor, according to the one noise signal and a sound signal collected by a microphone, the one noise signal from the sound signal that is collected by the microphone to obtain a signal that has been denoised;

wherein each of the signal extraction circuits is an input matching network;

wherein interconnecting a number of isolating circuits to combine the echo cancellation reference signals that are extracted by each of the signal extraction circuits into one noise signal at one noise channel comprises: selecting a first stage transformer, connecting each of a plurality of output matching networks to an output end of the first stage transformer to construct each of the isolating circuits, and interconnecting the output matching networks to form the one noise channel; and wherein the function of the input matching network is to realize the matching between an output impedance of the loudspeakers and an input impedance of the first stage transformer, the function of the output matching network is to ensure the matching between an output impedance of the first stage transformer and an input impedance of the processor.

7. The multichannel echo cancellation method according to claim 6, further comprising: constructing the input matching network and the output matching network by using passive elements, wherein the passive elements comprise resistors and capacitors;

wherein constructing the input matching network by using passive elements comprises:

selecting a first input resistor, a first input capacitor and a second input resistor, and connecting in series an input end of the first stage transformer to the first input capacitor, then connecting the first input capacitor in parallel to the second input resistor, and finally connecting in series to the first input resistor, to construct the input matching network, wherein an input end of the first stage transformer is connected in series to the first input capacitor, and then is connected to one end of the second input resistor and one end of the first input resistor, the other end of the second input resistor is connected to a first grounding end of the first stage transformer, the first grounding end is connected to a ground wire of the corresponding loudspeaker, and the other end of the first input resistor is connected to an audio signal wire of the corresponding loudspeaker; and wherein constructing by using passive elements the output matching network comprises:

selecting a first output resistor, a first output capacitor and a second output resistor, and connecting in series an output end of the first stage transformer to the first output resistor, then connecting the first output resistor in parallel to the second output resistor, and finally connecting in series to the first output capacitor, to construct the output matching network, wherein an output end of the first stage transformer is connected in series to the first output resistor, and then is connected to one end of the first output capacitor and one end of the second output resistor, the other end of the second output resistor is connected to a second grounding end of the first stage transformer, the second grounding end is connected to a ground wire of the processor, the other end of the first output capacitor is connected to the noise channel, and the noise channel is connected to an audio input end of the processor.

8. The multichannel echo cancellation method according to claim 7, wherein the first input capacitor and the first output capacitor are bridging capacitors, and the working frequency range of the first stage transformer is the same as the frequency range of the audio signal outputted to the loudspeaker.

9. The multichannel echo cancellation method according to claim 7, further comprising:

satisfying for a device lectotype of the input matching network the following condition:

$$\frac{\frac{R_{12} \times Z_1}{R_{12} + Z_1}}{\left(\frac{R_{12} \times Z_1}{R_{12} + Z_1}\right) + R_{11}} = A_1$$

where $R_{12}$ is a resistance value of the second input resistor, $Z_1$ is an input impedance of the first stage transformer, $R_{11}$ is a resistance value of the first input resistor, and $A_1$ is a preset transformer ratio value of the first stage transformer; and satisfying for a device lectotype of the output matching network the following condition:

$$\frac{(K_1 + R_{31}) \times R_{32}}{K_1 + R_{31} + R_{32}} = G$$

where $R_{31}$ is a resistance value of the first output resistor, $K_1$ is an output impedance of the first stage transformer, $R_{32}$ is a resistance value of the second output resistor, and G is an input impedance of an audio interface of the processor.

10. The multichannel echo cancellation method according to claim 9, further comprising:

selecting the first stage transformer be a low-frequency transformer, and selecting the working frequency range of the first stage transformer to be 10-20000 Hz; and selecting capacitance values of the first input capacitor and the first output capacitor to be 4.7 µF.

11. A smart device, comprising a multichannel echo cancellation circuit, the multichannel echo cancellation circuit comprising:

a processor;

a number of signal extraction circuits, and one end of each of the signal extraction circuits is connected to one of a number of audio channels corresponding to a number of loudspeakers, and wherein the number of the signal extraction circuits corresponds to the number of the audio channels of the loudspeakers, and each of the signal extraction circuits extracts part of each of audio signals as each of echo cancellation reference signals, from each of the audio channels corresponding to the number of the loudspeakers; and a number of isolating circuits, and one end of each of the isolating circuits is connected to other end of each of the signal extraction circuits, and wherein the number of the isolating circuits corresponds to the number of audio channels of the loudspeakers, and the isolating circuits are interconnected to combine the echo cancellation reference signals that are extracted by each of the signal extraction circuits into one noise signal at one noise channel, and the one noise signal at the one noise channel is further outputted to the processor, and wherein the processor, according to the one noise signal and a sound signal collected by a microphone, subtracts the one noise signal from the sound signal that is collected by the microphone to obtain a signal that has been denoised;

wherein each of the isolating circuits comprises a first stage transformer and an output matching network connected to an output end of the first stage transformer, and each of the signal extraction circuits is an input matching network, each of the audio signals of the loudspeakers passes through the input matching network to obtain each of the echo cancellation reference signals, each of the echo cancellation reference signals is inputted to the corresponding first stage transformer and then inputted to the corresponding output matching networks, and a plurality of the output matching networks are interconnected to form the one noise channel, the echo cancellation reference signals are combined into the one noise signal at the one noise channel;

and wherein the function of the input matching network is to realize the matching between an output impedance of the loudspeakers and an input impedance of the first stage transformer, the function of the output matching network is to ensure the matching between an output impedance of the first stage transformer and an input impedance of the processor.

12. The smart device according to claim 11, wherein the input matching network comprises: a first input resistor, a first input capacitor and a second input resistor, and an input end of the first stage transformer is connected in series to the first input capacitor, and then the first input capacitor is connected to one end of the second input resistor and one end of the first input resistor, the other end of the second input resistor is connected to a first grounding end of the first stage transformer, the first grounding end is connected to a ground wire of the corresponding loudspeaker, and the other end of the first input resistor is connected to an audio signal wire of the corresponding loudspeaker; and the output matching network comprises: a first output resistor, a first output capacitor and a second output resistor, and an output end of the first stage transformer is connected in series to the first output resistor, and then the first output resistor is connected to one end of the first output capacitor and one end of the second output resistor, the other end of the second output resistor is connected to a second grounding end of the first stage transformer, the second grounding end is connected to a ground wire of the processor, the other end of the first output capacitor is connected to the noise channel, and the noise channel is connected to an audio input end of the processor.

13. The smart device according to claim 12, wherein a device lectotype of the input matching network satisfies the following condition:

$$\frac{\frac{R_{12} \times Z_1}{R_{12} + Z_1}}{\left(\frac{R_{12} \times Z_1}{R_{12} + Z_1}\right) + R_{11}} = A_1$$

where $R_{12}$ is a resistance value of the second input resistor, $Z_1$ is an input impedance of the first stage transformer, $R_{11}$ is a resistance value of the first input resistor, and $A_1$ is a preset transformer ratio value of the first stage transformer; and a device lectotype of the output matching network satisfies the following condition:

$$\frac{(K_1 + R_{31}) \times R_{32}}{K_1 + R_{31} + R_{32}} = G$$

where $R_{31}$ is a resistance value of the first output resistor, $K_1$ is an output impedance of the first stage transformer, $R_{32}$ is a resistance value of the second output resistor, and G is an input impedance of an audio interface of the processor.

14. The smart device according to claim 12, wherein the first input capacitor and the first output capacitor are bridging capacitors;

the working frequency range of the first stage transformer is the same as the frequency range of the audio signal outputted to the loudspeaker;

the first stage transformer is a low-frequency transformer, and the working frequency range of the first stage transformer is 10-20000 Hz; and capacitance values of the first input capacitor and the first output capacitor are 4.7 µF.

* * * * *